United States Patent
Wakeford et al.

(10) Patent No.: US 9,483,854 B1
(45) Date of Patent: Nov. 1, 2016

(54) SYSTEM AND METHOD FOR PROVIDING CONTROLS IN A VIRTUAL SPACE BASED ON USER GEOLOCATIONS

(71) Applicant: KABAM, INC., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 8 days.

(21) Appl. No.: 13/791,516

(22) Filed: Mar. 8, 2013

(51) Int. Cl.
G09G 5/00 (2006.01)
G06T 11/60 (2006.01)
G06F 3/0481 (2013.01)
A63F 13/216 (2014.01)
G06F 3/0484 (2013.01)
G06T 19/00 (2011.01)

(52) U.S. Cl.
CPC .......... G06T 11/60 (2013.01); G06F 3/04815 (2013.01); A63F 13/216 (2014.09); G06F 3/0484 (2013.01); G06T 19/00 (2013.01)

(58) Field of Classification Search
None
See application file for complete search history.

(56) References Cited

U.S. PATENT DOCUMENTS

| | | | |
|---|---|---|---|
| 8,287,383 B1 | 10/2012 | Etter et al. | 463/42 |
| 8,649,803 B1* | 2/2014 | Hamill | 455/456.3 |
| 9,195,376 B1 | 11/2015 | Wakeford | |
| 2002/0183961 A1* | 12/2002 | French et al. | 702/150 |
| 2009/0017913 A1 | 1/2009 | Bell et al. | 463/40 |
| 2011/0250965 A1* | 10/2011 | Kulas et al. | 463/36 |
| 2011/0319148 A1 | 12/2011 | Kinnebrew et al. | 463/1 |
| 2012/0040745 A1 | 2/2012 | Auterio et al. | 463/25 |
| 2012/0244945 A1 | 9/2012 | Kolo et al. | 463/42 |
| 2012/0283855 A1* | 11/2012 | Hoffman | G01C 21/20 700/91 |
| 2013/0040714 A1* | 2/2013 | Rosing | A63F 13/06 463/7 |
| 2013/0344958 A1* | 12/2013 | Mullen | 463/31 |
| 2016/0074750 A1 | 3/2016 | Wakeford | |

OTHER PUBLICATIONS

Benford, Steve et al., University of Nottingham and Tandavanitj, Nick et al. Blast Theory, "Can You See Me Now?", ACM Transactions on Computer-Human Interaction, vol. 13, No. 1, Mar. 2006, pp. 100-133, 34 pages.

Duryee, Tricia (http://allthingsd.com/author/tricia/), "Zynga's New Mobile Game Will Incorporate Location-Based Check-Ins", Oct. 11, 2011 at 5:10 PM PT, http://allthingsd.com/20111011/zyngas-new-mobile-game-will-incorporate-location-based-c . . . , printed Feb. 4, 2013, 4 pages.

* cited by examiner

*Primary Examiner* — Jacinta M Crawford
*Assistant Examiner* — Diane Wills
(74) *Attorney, Agent, or Firm* — Sheppard Mullin Richter & Hampton LLP

(57) ABSTRACT

A system and method for facilitating control of virtual space entities based on user geolocations is disclosed. In such a system and method, one or more real-world spatial displacement requirements may be associated with corresponding virtual space maneuvers to connect user movements in real world locations with the virtual space. User performance of real-world spatial displacements may be obtained and compared with real-world spatial displacement requirements of interest. Virtual space maneuvers may be executed in the virtual space based on requesting user performance of real-world spatial displacements as required. Rewards, bonuses, virtual space enhancements and/or other incentives may be provided to the users based on qualities of their performance of real-world spatial displacement as required.

22 Claims, 3 Drawing Sheets

SYSTEM AND METHOD FOR PROVIDING CONTROLS IN A VIRTUAL SPACE BASED ON USER GEOLOCATIONS

FIELD OF THE DISCLOSURE

This disclosure relates to providing controls in a virtual space based on user geolocations, the controls including directing virtual space entities perform virtual space maneuvers between or among locations within the virtual space.

BACKGROUND

Systems that provide rewards to users based on geolocations of the users are known. In those systems, rewards may be provided to the users according to real world locations indicated by the user geolocations. For example, strength points in a game may be provided to a user when the user checks into a gym.

Systems that establish game rules based on user geolocations are also known. In those systems, game rules may be established using user geolocations as conditions to win the games. For example, user geolocation information may be overlaid on virtual map in a game such that a user in the real world may capture an online user virtual map when the real-world user's position is within a predetermined distance from the online user's position on the virtual map.

SUMMARY

One aspect of the disclosure relates to providing directional controls in a virtual space based on user geolocations, or geolocations of a device (e.g., a mobile phone or tablet) associated with a user. With such directional controls, users of the virtual space may be enabled to control virtual space entities in the virtual space when moving around in real world locations. Real world spatial displacement requirements may be associated with virtual space maneuvers or other commands or maneuvers to connect user movements in real world locations with the virtual space. A virtual space maneuver may be performed in the virtual space based on user performance of a real-world spatial displacement requirement corresponding to the virtual space maneuver. One or more parameters of the virtual space maneuver (e.g., direction, distance, power, speed, and/or other parameters) may be determined based on one or more parameters of the corresponding real-world spatial displacement that is performed. This may provide users directional and/or other maneuver controls in the virtual space by connecting user movements in the real world with virtual space entity movement in the virtual space. Such directional controls may enhance user experience with the virtual space as users move around in real world locations in order to participate in the virtual space.

Another aspect of the disclosure relates to enriching the virtual space by incorporating user movements in real world locations, as reflected in geolocations, into the virtual space. Metrics of real-world movements performed by users may be determined based on real-world spatial displacement requirements of interest. Rewards, bonuses, virtual space enhancements, and/or any other incentives may be provided to users based on such determined metrics. This may add dynamism brought by user movements in the real world to the virtual space and thus enhance user enjoyment of the virtual space.

In some implementations, a system configured to facilitate controls of virtual space maneuvers based on user geolocations may include one or more processors configured to execute one or more computer program modules. The computer program modules may include one or more of a space module, a user geolocation module, a real-world spatial displacement module, a virtual space maneuver module, a real-world spatial displacement specification module, a real-world spatial displacement analysis module and/or other modules.

The user geolocation module may be configured to obtain geolocation information indicating geolocations of the users. In some implementations, such location information regarding the users may be obtained from client devices associated with the users. Geolocation information obtained from a client device may specify the geolocation of the client device. The geolocation information may be transmitted wirelessly from the client devices. The user geolocation module may be configured to obtain the geolocation information in real-time, near-real time, and/or after a delay. The geolocation information may include one or more of Internet protocol address, MAC address, RFID information, Wi-Fi connection location, Global Positioning System coordinates, radio frequency triangulation information, and/or other information.

The real-world spatial displacement module may be configured to determine parameters of real-world spatial displacements performed by users. The determinations may involve analyzing user geolocations in the real world. In some implementations, the determinations may include computing a distance, speed, direction, course, power, and/or any other parameters of real-world spatial displacements performed by users. This may involve computing a length, time spent, geometry pattern, rotational angle, and/or any other properties for the real-world spatial displacements performed by users.

The virtual space maneuver module may be configured to associate real world spatial displacement requirements with corresponding virtual space maneuvers. Virtual space maneuvers may be performed by virtual space entities, such as but not limited to, virtual space objects, player controlled characters (i.e. avatars), non-player controlled characters (e.g. AI characters) and/or any other virtual space entities. Real-world spatial displacement requirements associated with the corresponding virtual space maneuvers may specify a minimum, maximum or exact distance, speed, geometry pattern, course, direction (e.g., above, under, south, north, and so on), rotational angles and/or other requirements for user performance of real-world spatial displacements. Real-world spatial displacement requirements may be determined based on properties (e.g., length, pattern, direction, rotational angle, and/or any other geometry properties) of the corresponding virtual space maneuvers. In some implementations, real-world spatial displacement requirements associated with virtual space maneuvers may be determined based on the virtual space entities that are configured to perform the virtual space maneuvers and/or characteristics of the users who request the virtual space entities to perform the virtual space maneuvers in the virtual space.

The real-world spatial displacement specification module may be configured to generate real-world displacement specifications specifying real-world spatial displacement requirements associated with corresponding virtual space maneuvers to be performed in the virtual space. This may involve obtaining real-world spatial displacement requirements based on user requested virtual space maneuvers. In some examples, representational information that may be used to illustrate real-world spatial displacement requirements may be generated.

The real-world spatial displacement analysis module may be configured to determine metrics of real-world spatial displacements performed by users. This may involve comparing real-world spatial displacements performed by users against real-world spatial displacement requirements associated with user requested virtual space maneuver. The metrics may include, such as but not limited to, relative direction, relative speed, percentage of completion, accuracy and/or any other metrics measuring real-world spatial displacements performed by users against real-world spatial displacement requirements of interest.

The space module may be configured to execute an instance of a virtual space. The space module may implement the instance of the virtual space to facilitate participation by users in the virtual space. This may involve receiving a user request specifying a virtual space maneuver to be performed by one or more virtual space entities (e.g., a character should move to the south for a distance in the virtual space). The user requested virtual space maneuver may be associated with a corresponding real-world spatial displacement requirement, as determined by the virtual space maneuver module. Accordingly, in executing of the virtual space maneuver, the space module may be configured to compare a real-world spatial displacement performed by the requesting user against the real-world spatial displacement requirement associated with the requested virtual space maneuver. This may involve obtaining parameters of real-world spatial displacement performed by the requesting user from the real-world spatial displacement module; and execute the requested virtual space maneuver based on these parameters. In some examples, the space module may be configured to obtain from the real-world spatial displacement analysis module metrics of user performed real-world spatial displacement. Based on such metrics, the space module may provide virtual space enhancement, bonuses, rewards, and/or other incentives to users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
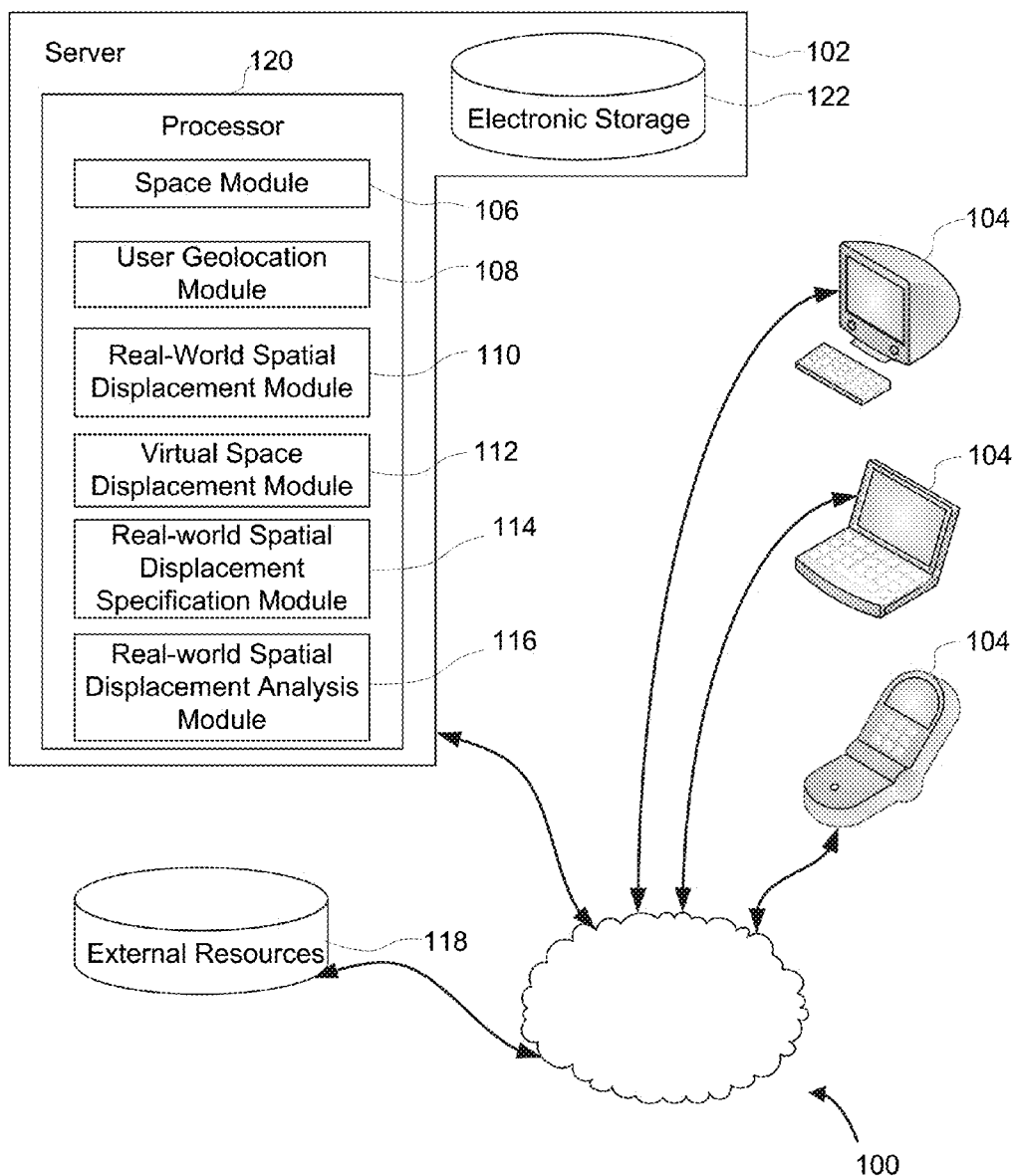
FIG. 1 illustrates an exemplary system configured to provide directional controls in a virtual space based on user geolocations.

FIG. 1 illustrates a system 100 configured to provide controls in a virtual base based on user geolocations. The controls may direct virtual space entities to perform user requested maneuvers within the virtual space. A virtual space maneuver may be associated with one or more corresponding real-world spatial displacement requirements. The real-world spatial displacement requirements may be determined based on one or more properties of the virtual space maneuver, such as but not limited to, a length, speed, geometry pattern, rotational angels and/or any other properties of the corresponding virtual space maneuver. In some examples, the real-world spatial displacement requirements may be determined based on the virtual entities configured to perform the corresponding virtual space maneuvers and/or characteristics of users who request the corresponding virtual space maneuvers to be performed in the virtual space.

The user requested virtual space maneuver may be executed in the virtual space based on the requesting user's performance of a real-world spatial displacement. In some implementations, the virtual space maneuver may be executed in a manner based on metrics measuring requesting user's performance of real-world spatial displacement against real-world spatial displacement requirements. Rewards, bonuses, virtual space enhancements and/or any other incentives may be provided to the users based on such metrics. This may facilitate a virtual space by connecting user movements in the real world with the virtual space. Accordingly, this may enhance and/or enrich user experience with the virtual space.

System 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, user geolocation module 108, real-world spatial displacement module 110, virtual space maneuver module 112, real-world spatial displacement specification module 114, real-world spatial displacement analysis module 116, and/or other modules.

The user geolocation module 108 may be configured to obtain geolocation information indicating current geolocations of the users. In some implementations, such location information regarding the users may be obtained from client devices associated with the users, such as the client devices 104 as illustrated. The geolocation information obtained from the client devices 104 may specify the physical locations of client devices 104. The geolocation information may include one or more of Internet protocol address, MAC address, RFID information, Wi-Fi connection location, Global Positioning System coordinates, radio frequency triangulation information, information entered to client device 104 by a user (e.g., specifying the location of client 104), and/or other information that may identify a real world location. The user geolocation module 108 may be configured to obtain geolocation information of one or more of client device 104 in a substantially ongoing manner (e.g., at a sampling rate), at discrete intervals, responsive to user selection or input, and/or according to other schemes. The user geolocation module 108 may be configured to obtain geolocation information that has been transmitted wirelessly from client devices 104. The user geolocation module 108 may be configured to obtain geolocation information that has been stored at client devices 104 for transmission to user geolocation module 108 at a later time (e.g., when docked to a computer). The user geolocation module 108 may be configured to manage storage of geolocation of client devices 104. This may facilitate determination of the geolocation of one of client device 104 at some previous time.

The real-world spatial displacement module 110 may be configured to determine parameters of real-world spatial displacements of users. Parameters of a real-world spatial displacement of a user may include, for example but not limited to, a distance, length, time spent, a speed, a direction, a rotational angle, a course, and/or any other parameters. The distance a real-world spatial displacement may be determined by processing the starting and end geolocations along the real-world spatial displacement through a distance function. In cases where the real-world spatial displacement does not form a straight line, a length of the real-world spatial displacement may be determined by processing three or more geolocations along the real-world spatial displacement through a length function.

The speed of a real-world spatial displacement of a user may indicate a rate (e.g., 3 feet/second) at which the user performs the real-world spatial displacement. Determination of the speed of a real-world spatial displacement of a user may be made by dividing the distance or length of the real-world spatial displacement with the time spent to perform the real-world spatial displacement by the user. The direction of a real-world spatial displacement may be may be defined in a 2D or 3D space within the real world. For example, a user may perform a real-world spatial displacement in directions north-south-east-west and/or up-down. In some examples, the direction of a real-world spatial displacement may indicate a temporal order of the geolocations along the real-world spatial displacement as traversed by a user. A course of a real-world spatial displacement of a user may indicate specific temporal order or geolocations along the real-world spatial displacement traversed by a user. Such a course may be determined by juxtaposing the time and geolocations along the real-world spatial displacement as traverse by the user.

In any case, for determinations of parameters of real-world spatial displacements of users, the real-world spatial displacement module 110 may be configured to obtain user geolocations through user geolocation module 108. In some examples, the user geolocations may be obtained at a frequency of, for example, every 10 seconds, every 30 seconds, every 1 minute, every 5 minutes and so on. Such a frequency may be determined by a provider, administrator, moderator, and/or any other entities related to the virtual space at a configuration stage of the real-world spatial displacement module 110 (e.g., during manufacturing of the system 100) or dynamically at a runtime of the system 100.

The virtual space maneuver module 112 may be configured to associate virtual space maneuvers with corresponding real-world spatial displacement requirements. A virtual space maneuver may be characterized by using, for example but not limited to, a distance, a speed, a geometry pattern, direction, a course and/or any other geometry property that may be used to characterize a virtual space maneuver. A virtual space maneuver may be may be defined in a 2D or 3D space within the virtual space. Virtual space maneuvers may be performed by virtual space entities within the virtual space. Virtual space entities may include virtual space objects, such as but not limited to, vehicle, flying apparatus, stones, catapult, wagon, train, and/or any other virtual space objects that may be displaced within the virtual space. Virtual space entities may include virtual space characters, either controlled by users (e.g., avatars) or controlled by artificial intelligence provided by system 100 (e.g., AI characters). Virtual space characters may be configured to perform virtual space maneuvers. For example, a knight may be configured to traverse from any location to another location within the virtual space. It is understood that the above examples of virtual space entities that may perform virtual space maneuvers are described for illustration purpose only and thus are not intended to be limiting. One of ordinary skilled in the art will recognize any other virtual space entities may perform virtual space maneuvers as desired by the provider, administrator, moderator, and/or any other entities related to the virtual space.

Locations within a virtual space may have geographical relationships as defined by the provider, administrator, moderator, and/or any other entities related to the virtual space. For example, it may be defined in the virtual space that city A lies south of city B and is surrounded by Mountain M on the east side of city A. State information may be determined for a representation of virtual space implemented on client device 104. The state information may be used to facilitate views of virtual space that capture the defined geographical relationships between or among locations in the virtual space. For example, when presented on a screen of a client device 104, the city A may appear south of city B in a view of the virtual space. A real-world spatial displacement requirement may be associated with a virtual space maneuver by a provider, administrator, moderator, and/or any other entities related to the virtual space. For example, a virtual space maneuver from city A to city B performed by a knight may be associated with a real-world spatial displacement requirement of 50 feet, to the north, to be performed by a user.

A real-world spatial displacement requirement associated with a virtual space maneuver may specify a minimum, maximum or exact distance, speed, geometry pattern, course, direction (e.g., above, under, south, north, and so on), rotational angles and/or other requirements for user performance of real-world spatial displacements. In some implementations, the real-world spatial displacement requirements may be determined based on properties of corresponding virtual space maneuvers. For example, in the case where city A is defined as being two virtual space distance units away (a virtual space distance unit, for example such as a tile, block, grid, etc., may be defined to map out the virtual space) from city B to the north, the virtual space maneuver from city A to B, for example performed by a knight, in that case may be determined as two virtual space distance units starting from city A, to the north, and ending at city B. Based on such a virtual space maneuver, a real-world spatial displacement requirement may be determined by virtual space maneuver module 112 such that the determined real-world spatial displacement requirement to connect user movement in the real world with the virtual space. For instance, a real-world spatial displacement requirement of 50 feet starting to the north may be associated with that virtual space maneuver.

In some implementations, real-world spatial displacement requirements associated with corresponding virtual space maneuvers may be determined based on the virtual space entities that are configured to perform the virtual space maneuvers. For example, more than one real-world spatial displacement requirements may be associated with one virtual space maneuver for different virtual space entities. For instance, in the case where the virtual space maneuver is 2 virtual space distance unit starting from city A, to the north, and ending at city B, different real-world spatial displacement requirements may be associated with different virtual space entities for performing this virtual space maneuver: e.g., 50 feet to the north in the real world for a knight to perform this virtual space maneuver, 100 feet to the north in the real world for troop, 25 feet to the north in the real world for a zeppelin, and so on. Such virtual space entity specific real-world spatial displacement requirements may reasonably differentiate different movement cost for different virtual space entities to perform the corresponding virtual space maneuver within the virtual space.

In some implementations, real-world spatial displacement requirements associated with virtual space maneuvers may be determined based on the characteristics of the users who request the virtual space entities to perform the virtual space maneuvers in the virtual space. For example, a real-world spatial displacement requirement associated with a virtual space maneuver may be determined dynamically based on a user health level including, but not limited to, blood pressure, heart rate, weight, body fat percentage, and/or any other health indicators that may be manifested by the user or determined for the user. For example, in the case where a user requests a virtual entity to perform the virtual space maneuver of 2 virtual space distance units starting from city A, to the north, and ending at city B, the real-world spatial displacement requirement may be determined dynamically by virtual space maneuver module 112 such that the determined requirement takes into account of the user's health level. For instance, in the case where it is determined that the user's health level indicates a normal health range, a real-world spatial displacement requirement of 50 feet to the north may be determined for that user. In another case where it is determined that the user's health level indicates a below-normal health range, a reduced real-world spatial displacement requirement, e.g., 30 feet to the north may be determined for that user.

In some implementations, real-world spatial displacement requirements specify a speed at which the real-world spatial displacement requirements should be performed by users. This may reflect a speed at which a virtual space entity may perform the virtual space maneuver in the virtual space. For example, a real-world spatial displacement requirement associated with a virtual space maneuver of 2 virtual space distance unit starting from city A, to the north, and ending at city B, performed by a knight, may be associated with a speed at which a user should perform the associated real-world spatial displacement requirement of 50 feet to the north, e.g., at 5 feet per second.

The real-world spatial displacement specification module 114 may be configured to generate a real-world spatial displacement specification responsive to receiving a user request to direct a virtual space entity to perform a virtual space maneuver. The real-world spatial displacement specification may specify a real-world spatial displacement requirement associated with a corresponding virtual space maneuver. Such a specification may notify the requesting user to perform the real-world spatial displacement requirement associated with the requested virtual space maneuver in order for the user to direct a virtual space entity to perform the requested virtual space maneuver in the virtual space. In some implementations, graphical and/or audio information may be generated to represent the real-world spatial displacement specification. For example, to illustrate a real-world spatial displacement requirement is associated with a user requested virtual space maneuver, graphical and/or audio information may be generated and included in the real-world spatial displacement specification such that the representational information may convey to the requesting user, though animations, texts, audio, video, still images, and/or other communication means, that the user should perform the real-world spatial displacement requirement in order for the requested virtual space maneuver to be performed in virtual space.

The real-world spatial displacement analysis module 116 may be configured to determine metrics of real-world spatial displacements performed by users. A metric of a real-world spatial displacement performed by a user may be determined by comparing a parameter of real-world spatial displacement performed by a user against a real-world spatial displacement requirement of interest. Metrics of a real-world spatial displacement performed by a user may include, such as but not limited to, relative direction, relative speed, percentage of completion, accuracy and/or any other metrics measuring real-world spatial displacements performed by users against real-world spatial displacement requirements of interest. For example, in the case where the real-world spatial displacement requirement of interest is 50 feet to the north, metrics of a user performance of real-world spatial displacement may be determined by assigning weighted scores. For instance, it may be determined that the user has performed a real-world spatial displacement for 48 feet starting from a first user geolocation, to north west, and ending at a second user geolocation. A weighted score may be assigned to such a user performance of real-world spatial displacement for a measurement of the user overall performance as compared to the real-world spatial displacement requirement of interest. For example, in the instance described above, a score may be given to the user performance of the 48 feet distance against the 50 feet as required and another score for going northwest against the going north as required. The two scores may be weighted to derive a weighted sore that measures the overall performance of the real-world spatial displacement of interest by the user.

Space module 106 may be configured to implement an instance of the virtual space executed by the computer modules. The instance of the virtual space may provide a state of the virtual space at a particular time. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the virtual space determined from the instance executed by space module 106 is not intended to be limiting. The virtual space may be presented in a more limited or richer manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control virtual entities such as characters and/or objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled virtual space entities in the virtual space. Control may be exercised through control inputs and/or commands provided by the users through client computing platforms 104. The control inputs and/or commands provided by the user may specify a virtual space maneuver for which one or more virtual space entities should perform in the virtual space. For example, a user, e.g., through the client device 104, may send a command to the space module 106, wherein the command may specify a requested virtual space maneuver, e.g., moving from city A, to the north, to city B, to be performed by a knight controlled by the user. Such a command may be initiated by a directional control available to the user through the client device 104, such as but not limited to, a mouse drag, finger swipe, motion, voice command, tilting, and/or any other directional controls available through client device 104 to the user. The space module 106 may execute this user initiated request by updating the state information affecting the virtual entity or entities involved in the user request. For example, the state information may be updated to associate an art representing movements done by a knight (e.g., animated images of the knight expressing the knight's movement in the virtual space) such that when the virtual space state information is transmitted to the client device 104, a representation of knight performing the user requested virtual space maneuver may be expressed on the client device 104.

As described above, a user requested virtual space maneuver may be associated with one or more real-world spatial displacements. Accordingly, in executing such user requested virtual space maneuver, the space module 106 may be configured to compare a real-world spatial displacement performed by the requesting user against a corresponding real-world spatial displacement requirement associated with the requested virtual space maneuver. In some implementations, such a comparison may be made by the space module 106 prior to executing the requested virtual space maneuver. For example, in a case where a user requests system 100, via space module 106, to direct a knight to move from city A to city B in the virtual space, the request may specify a virtual space maneuver, e.g., 2 virtual space distance units, to the north, starting from city A and ending at city B, to be performed by the knight. Responsive to such a request, the space module 106 may be configured to obtain the real-world spatial displacement requirements associated with the requested virtual space maneuver from the virtual space maneuver module 112; obtain parameters of the user performance of real-world spatial displacement from the real-world spatial displacement module 110; and execute the user requested virtual space maneuver based on a comparison of user performance of real-world spatial displacement against real-world spatial displacement requirements.

In some implementation, the space module 106 may be configured to execute the user requested virtual space maneuver responsive to a determination that the user has successfully performed a real-world spatial displacement required by the real-world spatial displacement requirement associated with the requested virtual space maneuver. Such determinations may be made based on the parameters of real-world spatial displacements performed by the users. For example, if parameters of a real-world spatial displacement performed by a requesting user indicate that the user has traverse 50 feet to his north in 10 seconds as required by a real-world spatial displacement requirement associated with a virtual space maneuver requested by that user, the space module 106 may then execute the requested maneuver in the virtual space. In contrast, if the parameters indicate that the user has only traversed 40 feet to his north in 10 seconds, the space module 106 may determine not to execute the requested maneuver in the virtual space.

In some implementations, the space module 106 may be configured to execute the requested virtual space maneuver according to the parameters of the real-world spatial displacements performed by the users. For example, if parameters of real-world spatial displacement performed by a user indicate the user has moved 50 feet to his north in 6 seconds, the space module 106 may execute the requested virtual space maneuver by the knight at 6 inch per second to the north. In another example, where parameters of real-world spatial displacement performed by a user indicate the user has moved 50 feet to his north in 10 seconds, the space module 106 may execute the requested virtual space maneuver by the knight at 3 inch per second to the north.

In some implementations, the space module 106 may be configured to execute the requested virtual space maneuver based on metrics of the user performance of the real-world spatial displacement requirement, as determined by real-world spatial displacement analysis module 116. For example, the metrics of the user performance of the real-world spatial displacement requirement, as determined by real-world spatial displacement analysis module 116 may be used to determine amount of fatigue, wear and tear, damages, morale boost and/or any effects that may be induced to the virtual space entity or entities due to completion of the requested virtual space maneuver, the manner of the virtual space maneuver performed by virtual space entity or entities (e.g., gingerly, fast paced, tiredly, merrily), and/or any other parameters that may be associated with the execution of the requested virtual space maneuver. For instance, in the case where it is determined that the user has performed a real-world spatial displacement at much higher speed than that is required by the corresponding real-world spatial displacement requirement associated with virtual space maneuver requested by that user, the space module 106 may induce less fatigue to the virtual space entity at the completion of the requested virtual space maneuver performed by the knight.

In some implementations, the space module 106 may be configured to provide virtual space enhancements based on the metrics of the user performance of the real-world spatial displacement requirement, as determined by real-world spatial displacement analysis module 116. For example, in a case where the user requests to move troop from city A to city B in the virtual space which requires the user to move 100 feet in 10 seconds in the real world, the user actually moves 150 feet in 10 second in the real world. In that example, a special virtual skill, e.g., speedy marching, may be given to the requesting user's troop such that the marching ability of requesting user's troop (e.g., longest distance marched in one virtual space day) may be increased accordingly.

In some implementations, the space module 106 may be configured to provide rewards to users based on metrics of the user performance of the real-world spatial displacement requirement, as determined by real-world spatial displacement analysis module 116. The rewards may include virtual items, virtual currency, invitation to exclusive virtual space event, mission, campaign, etc., discounts for purchasing virtual items, real world items, real world currency and/or any other rewards. For example a user may be rewarded with experience points for performing real-world spatial displacement at a quality above that required by the real-world spatial displacement requirement associated with a requested virtual space maneuver (e.g., faster, longer, higher, more accurate than that required by the real-world spatial displacement requirement).

The server 102, client computing platforms 104, and/or external resources 108 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 118, external entities participating with system 100, and/or other resources. For example, the influence information module 108 may be configured to obtain the information indicating a user's influence in the virtual space from the external resources 118. In some implementations, some or all of the functionality attributed herein to external resources 118 may be provided by resources included in system 100.

Server 102 may include electronic storage 116, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114, 116 and/or other modules. Processor 120 may be configured to execute modules 106, 108, 110, 112, 114, 116, and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116 are illustrated in FIG. 1 as being implemented within a single processing unit, in implementations in which processor 120 includes multiple processing units, one or more of modules 106, 108, 110, 112, 114, 116 may be implemented remotely from the other modules. The description of the functionality provided by the different modules 106, 108, 110, 112, 114 described below is for illustrative purposes, and is not intended to be limiting, as any of modules 106, 108, 110, 112, 114, 116 may provide more or less functionality than is described. For example, one or more of modules 106, 108, 110, 112, 114 may be eliminated, and some or all of its functionality may be provided by other ones of modules 106, 108, 110, 112, 114, 116. As another example, processor 120 may be configured to execute one or more additional modules that may perform some or all of the functionality attributed below to one of modules 106, 108, 110, 112, 114, 116.

Figure 2:
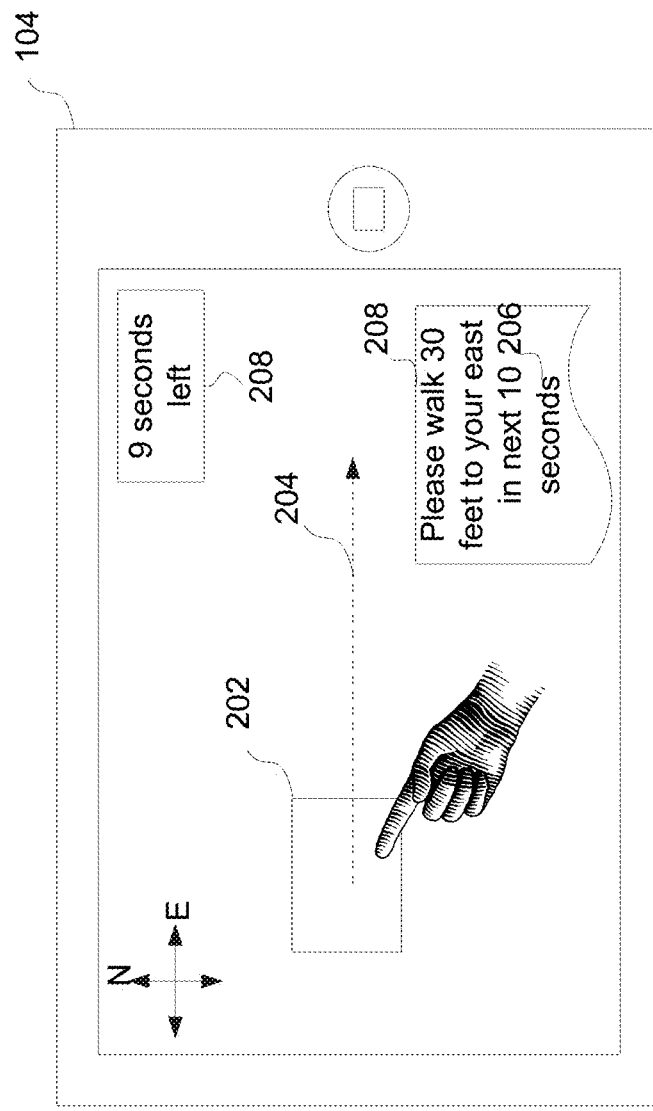
FIG. 2 illustrates one example of facilitating directional control of a virtual space entity in accordance with one embodiment of the disclosure.

FIG. 2 illustrates one example of facilitating directional control of a virtual space entity using system 100 in accordance with one embodiment of the disclosure. As illustrated, a client device 104, e.g., a smartphone as shown, may be presenting a view of a virtual space in this example. In the view, a virtual entity, e.g., an object in this example, 202 may be presented. A virtual space maneuver 204 may be requested by a user such that the object 202 may be moved to the east in the virtual space. As illustrated in this example, such a request may be initiated by the user through a finger swipe. As described above, responsive to receiving the request initiated by the user, the system 100 may obtain a real-world spatial displacement requirement 206, e.g., via the virtual space maneuver module 112, that is associated with the requested virtual space maneuver 204. In this example, the real-world spatial displacement requirement 206 may be configured such that it specifies a distance of 30 feet and a direction of to the user's east as shown. As also shown, a time interval of 10 second for the user to perform the real-world spatial displacement requirement 206 may be specified. Responsive to obtaining the real-world spatial displacement 206, the system 100 may generate, e.g., via the real-world spatial displacement specification module 114, representational information that may be used to notify the user of the real-world spatial displacement requirement 206 associated with the requested virtual space maneuver 204. In this example, as shown, textual representation of the real-world spatial displacement requirement 206 in dialog boxes 208 may be generated, transmitted to and presented on the client device 104. Also as shown in this example, count down information may also be generated and presented in the dialog box 208 notifying the user of time left for the user to complete a real-world spatial displacement as required by the real-world spatial displacement requirement 206. The system 100 may execute the requested virtual space maneuver 204 via space module 106 based on the the user's performance of a real-world spatial displacement as required by the real-world spatial displacement requirement 206.

Figure 3:
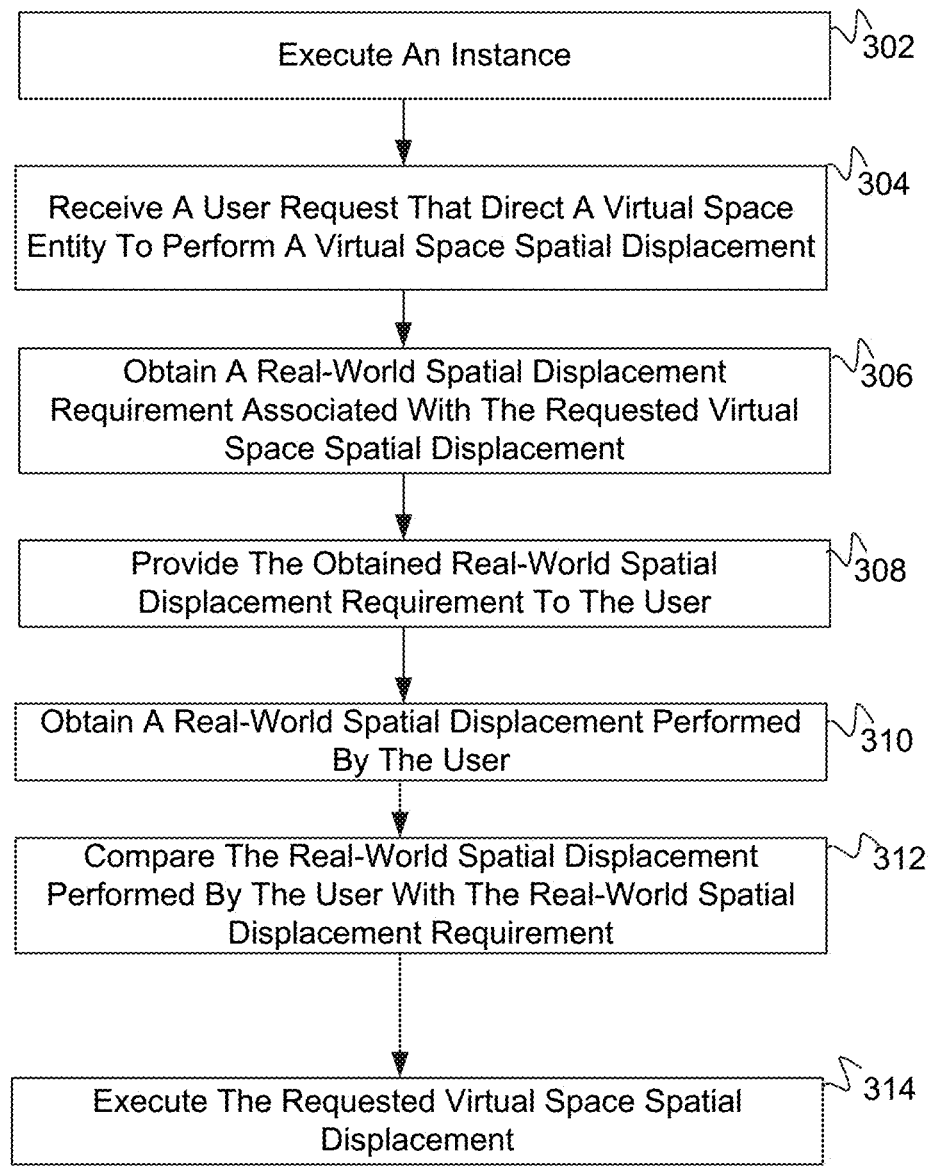
FIG. 3 illustrates one exemplary method of providing directional controls in a virtual space based on user geolocations.

FIG. 3 illustrates one exemplary method of facilitating a user defined virtual space. The operations of method 300 presented below are intended to be illustrative. In some embodiments, method 300 may be accomplished with one or more additional operations not described, and/or without one or more of the operations discussed. Additionally, the order in which the operations of method 60 are illustrated in FIG. 2 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed and implemented to facilitate user participation in the virtual space. The users may participate in the virtual space by initiating a request to direct a virtual space entity or entities to perform a virtual space maneuver. Such a user request may be executed in the virtual space such that the involved virtual space entity or entities may be maneuvered in the virtual space. In some implementations, operation 302 may be performed by a space module the same as or similar to space module 106 (shown in FIG. 1 and described herein).

At an operation 304, a user request that direct a virtual space entity to perform a virtual space maneuver may be received. In some implementations, operation 304 may be performed by a space module the same as or similar to space module 106 (shown in FIG. 1 and described herein).

At operation 306, a real-world spatial displacement requirement associated with the virtual space maneuver received in operation 304 may be obtained. In some implementations, operation 306 may be performed by a virtual space maneuver module the same as or similar to virtual space maneuver module 112 (shown in FIG. 1 and described herein).

At operation 308, the obtained real-world spatial displacement requirement may be provided to the requesting user. In some examples, graphical and/or audio representation of the obtained real-world spatial displacement requirement may be presented to the user. In some implementations, operation 308 may be performed by a virtual space maneuver speciation module the same as or similar to virtual space maneuver specification module 114 (shown in FIG. 1 and described herein).

At operation 310, parameters of a real-world spatial displacement performed by the requesting user may be obtained. In some implementations, operation 310 may be performed by a real-world spatial displacement module the same as or similar to real-world spatial displacement module 110 (shown in FIG. 1 and described herein).

At operation 312, the real-world spatial displacement performed by the requested user, as obtained in operation 310, may be compared with real-world spatial displacement requirement obtained in operation 306. In some implementations, operation 312 may be performed by a to real-world spatial displacement analysis module the same as or similar to real-world spatial displacement analysis module 116 (shown in FIG. 1 and described herein).

At operation 314, the requested virtual space maneuver may be executed in the virtual space based on the result of operation 312. In some implementations, operation 314 may be performed by a space module the same as or similar to space module 106 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide controls in a virtual space based on user geolocations, the system comprising:
    a game server communicating with one or more client devices associated with users, the game server comprising one or more processors configured by machine-readable instructions to:
        execute an instance of a virtual space;
        implement the instance of the virtual space to facilitate user participation in the virtual space, wherein the user participation in the virtual space is facilitated by receiving and executing user requests from the one or more client devices that direct one or more virtual space entities to perform virtual space maneuvers within the virtual space, wherein the virtual space maneuvers include one or more of actions and/or movements performed within the virtual space by the one or more virtual space entities, and/or something done within the virtual space by the one or more virtual space entities;
        receive the user requests from the one or more client devices that direct the one or more virtual space entities to perform the virtual space maneuvers within the virtual space, such that a first user request is received from a first user through a first client device associated with the first user directing a first virtual space entity to perform a first virtual space maneuver, the first virtual space maneuver including an action and/or movement performed within the virtual space by the first virtual space entity, and/or something done by the first virtual space entity within the virtual space;
        obtain geolocation information associated with the one or more client devices indicating geolocations of the one or more client devices including the first client device; and
        determine parameters of real-world spatial displacements of the users by analyzing geolocations of the one or more client devices;
        associate one or more of the virtual space maneuvers with corresponding real world spatial displacement requirements, wherein real world spatial displacements include a spatial displacement of the one or more client devices, such that the virtual space maneuvers requested are performed in the virtual space based on performances of the corresponding real world spatial displacement requirements, wherein the first virtual space maneuver is associated with a first real world spatial displacement requirement;
        responsive to receiving a real-world spatial displacement of the first client device, compare the real-world spatial displacement of the first client device associated with the first user against the first real-world spatial displacement requirement associated with the first virtual space maneuver requested; and
        responsive to a determination, based on the comparison, that the real-world spatial displacement of the first client device associated with the first user satisfies the first real-world spatial displacement requirement associated with the first virtual space maneuver, execute the first user request in the instance of the virtual space causing the first virtual space entity to perform the first virtual space maneuver.

2. The system of claim 1, wherein the one or more processors are further configured by machine-readable instructions to determine the first real-world spatial displacement requirement associated with the first virtual space maneuver based on one or more:
    a length of the first virtual space maneuver;
    a direction of the first virtual space maneuver;
    a geometry pattern formed by the first virtual space maneuver;
    a speed at which the first virtual space maneuver should be performed in the virtual space;
    a course in which the first virtual space maneuver is performed; or
    a virtual space entity or entities that are configured to perform the first virtual space maneuver in the virtual space.

3. The system of claim 2, wherein the first real-world spatial displacement requirement is determined further based on one or more characteristics of the first user.

4. The system of claim 1, wherein the first real-world spatial displacement requirement specifies one or more of:
    a speed at which a real-world spatial displacement should be performed;
    a distance for which a real-world spatial displacement should be performed;
    a direction a real-world spatial displacement should be performed;
    a course in which a real-world spatial displacement should be performed; or
    a time interval in which a real-world spatial displacement should be performed.

5. The system of claim 1, wherein the one or more processors are further configured by machine-readable instructions to generate a first real-world spatial displacement specification specifying that the first real-world spatial displacement requirement should be performed in order for the first user to direct the first virtual space entity to perform the first virtual space maneuver responsive to receiving the first user request.

6. The system of claim 1, wherein the first user request is executed such that the first virtual space entity performs the first virtual space maneuver according to the parameters of the real-world spatial displacement of the first client device such that the first virtual space maneuver is performed by the first virtual space entity in a way proportional to the real-world spatial displacement of the first client device, the parameters including a speed, a direction, a distance and/or a course.

7. The system of claim 1, wherein the one or more processors are further configured by machine-readable instructions to:
  determine metrics of real-world spatial displacements of the one or more client devices by comparing the real-world spatial displacements of the one or more client devices against the real-world spatial displacement requirements associated with the corresponding virtual space maneuvers; and,
  execute the first user request in the instance of the virtual space further based on one or more metrics determined for the real-world spatial displacement of the first client device.

8. The system of claim 7, wherein the first user request is executed such that the first virtual space entity receives enhancements related to the virtual space based on the metrics determined for the real-world spatial displacement of the first client device.

9. The system of claim 7, wherein the one or more processors are further configured by machine-readable instructions to provide one or more rewards to the users based on the metrics determined for the real-world spatial displacements of the one or more client devices; and,
  responsive to a determination of the metrics for the real-world spatial displacement of the first client device, provide a first reward to the first user.

10. The system of claim 1, wherein the direction of the first virtual space maneuver performed in the virtual space is the same as the direction of the real-world spatial displacement of the first client device associated with the first user.

11. The system of claim 1, wherein the distance of the first virtual space maneuver performed in the virtual space is proportional to the distance of the real-world spatial displacement of the first client device associated with the first user.

12. A computer-implemented method of facilitating user defined virtual space, the method being implemented in a game server comprising one or more physical processors configured by machine-readable instructions to execute the method, the game server in electronic communication with one or more client devices associated with one or more users, the method comprising:
  executing an instance of a virtual space;
  implementing the instance of the virtual space to facilitate user participation in the virtual space, wherein the user participation in the virtual space is facilitated by receiving and executing user requests, from the one or more client devices that direct one or more virtual space entities to perform virtual space maneuvers within the virtual space, wherein the virtual space maneuvers include one or more of actions and/or movements performed within the virtual space by the one or more virtual space entities, and/or something done within the virtual space by the one or more virtual space entities;
  receiving the user requests from the one or more client devices that direct the one or more virtual space entities to perform the virtual space maneuvers within the virtual space, such that a first user request is received from a first user through a first client device associated with the first user directing a first virtual space entity to perform a first virtual space maneuver, the first virtual space maneuver including an action and/or movement performed within the virtual space by the first virtual space entity, and/or something done by the first virtual space entity within the virtual space;
  obtaining geolocation information associated with the one or more client devices indicating geolocations of the one or more client devices including the first client device; and
  determining parameters of real-world spatial displacements of the one or more client devices by analyzing geolocations of the one or more client devices;
  associating one or more of the virtual space maneuvers with corresponding real world spatial displacement requirements, wherein real world spatial displacements include a spatial displacement of the one or more client devices, such that the virtual space maneuvers requested are performed in the virtual space based on performances of the corresponding real world spatial displacement requirements, wherein the first virtual space maneuver is associated with a first real world spatial displacement requirement;
  responsive to receiving a real-world spatial displacement of the first client device, comparing the real-world spatial displacement of the first client device against the first real-world spatial displacement requirement associated with the first virtual space maneuver requested; and
  responsive to a determination, based on the comparison, that the real-world spatial displacement of the first client device associated with the first user satisfies the first real-world spatial displacement requirement associated with the first virtual space maneuver, executing the first user request in the instance of the virtual space causing the first virtual space entity to perform the first virtual space maneuver.

13. The method of claim 12, further comprising determining the first real-world spatial displacement requirement associated with the first virtual space maneuver based on one or more:
  a length of the first virtual space maneuver;
  a direction of the first virtual space maneuver;
  a geometry pattern formed by the first virtual space maneuver;
  a speed at which the first virtual space maneuver should be performed in the virtual space;
  a course in which the first virtual space maneuver is performed; or
  a virtual space entity or entities that are configured to perform the first virtual space maneuver in the virtual space.

14. The method of claim 13, wherein the first real-world spatial displacement requirement is determined further based on one or more characteristics of the first user.

15. The method of claim 12, wherein the first real-world spatial displacement requirement specifies one or more:
  a speed at which a real-world spatial displacement should be performed;
  a distance for which a real-world spatial displacement should be performed;
  a direction a real-world spatial displacement should be performed;
  a course in which a real-world spatial displacement should be performed; or
  a time interval in which a real-world spatial displacement should be performed.

16. The method of claim 12, further comprising generating a first real-world spatial displacement specification specifying that the first real-world spatial displacement requirement should be performed by the first user in order for the first user to direct the first virtual space entity to perform the first virtual space maneuver responsive to receiving the first user request.

17. The method of claim 12, wherein the first user request is executed such that the first virtual space entity performs the first virtual space maneuver according to the parameters of the real-world spatial displacement of the first client device such that the first virtual space maneuver is performed by the first virtual space entity in a way proportional to the real-world spatial displacement of the first client device, the parameters including a speed, a direction, a distance and/or a course.

18. The method of claim 12, further comprising determining metrics of real-world spatial displacements performed by users by comparing the real-world spatial displacements of the one or more client devices against the real-world spatial displacement requirements associated with the corresponding virtual space maneuvers, and executing the first user request in the instance of the virtual space further based on one or more metrics determined for the real-world spatial displacement of the first client device.

19. The method of claim 18, wherein the first user request is executed such that the first virtual space entity receives enhancements related to the virtual space based on the metrics determined for the real-world spatial displacement of the first client device.

20. The method of claim 18, further comprising one or more rewards to the users based on the metrics determined for the real-world spatial displacements of the one or more client devices, and wherein responsive to a determination of the metrics for the real-world spatial displacement of the first client device, a first reward is provided to the first user.

21. The method of claim 12, wherein the direction of the first virtual space maneuver performed in the virtual space is the same as the direction of the real-world spatial displacement of the first client device associated with the first user.

22. The method of claim 12, wherein the distance of the first virtual space maneuver performed in the virtual space is proportional to the distance of the real-world spatial displacement of the first client device associated with the first user.

\* \* \* \* \*